US 6,582,980 B2

(12) United States Patent
Feldman et al.

(10) Patent No.: US 6,582,980 B2
(45) Date of Patent: Jun. 24, 2003

(54) SYSTEM FOR INTEGRATING DIGITAL CONTROL WITH COMMON SUBSTRATE DISPLAY DEVICES

(75) Inventors: Rodney D. Feldman, Rochester, NY (US); Ronald S. Cok, Rochester, NY (US); David J. Williams, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 222 days.

(21) Appl. No.: 09/774,221

(22) Filed: Jan. 30, 2001

(65) Prior Publication Data

US 2002/0142504 A1 Oct. 3, 2002

(51) Int. Cl.[7] .............................. H01L 21/00; G09G 5/00
(52) U.S. Cl. .......................... 438/28; 438/34; 345/205; 345/206
(58) Field of Search .............................. 438/28, 29, 30, 438/34; 349/151–6; 345/205, 206

(56) References Cited

U.S. PATENT DOCUMENTS

| | | | |
|---|---|---|---|
| 4,769,292 A | | 9/1988 | Tang et al. |
| 5,061,569 A | | 10/1991 | VanSlyke et al. |
| 5,258,325 A | | 11/1993 | Spitzer et al. |
| 5,737,272 A | | 4/1998 | Uchiyama et al. |
| 5,793,363 A | | 8/1998 | Takuwa |
| 5,995,189 A | | 11/1999 | Zhang |
| 6,005,652 A | | 12/1999 | Matsuhira |
| 6,055,034 A | | 4/2000 | Zhang et al. |
| 6,160,271 A | * | 12/2000 | Yamazaki et al. ............ 257/99 |
| 6,380,560 B1 | * | 4/2002 | Yamazaki et al. ............ 257/72 |
| 2002/0126108 A1 | * | 9/2002 | Koyama et al. |

FOREIGN PATENT DOCUMENTS

JP  411088803 A  * 3/1999

OTHER PUBLICATIONS

Internet article: The Financial Express, www.financialexpress.com, Y. Inoue, Sharp sees potential its panel technology, 2000, pp. 1–3.
Sony Product Spec., CXA2112R, LCD Driver, pp. 1–23.
Sony Product Spec, Digital Signal Driver/Timing Generator, CXD2467Q, pp. 1–38.
Internet article: ein–Electronics Industry News, www.eet-.com, Y. Hara, Toshiba integrates SRAM low–power LCD, 2000, 1 page.
EPSON Product Spec, Graphics, SED1355 Embedded Ramdac LCD/CRT Controller, Oct. 19 pp. 1–42.
Internet article: SHARP, sharp–world.com, Sharp Develops the World's First Continuous Grain silicon (CGS) Technology, Jan. 1998, pp. 1–6.

* cited by examiner

Primary Examiner—John F. Niebling
Assistant Examiner—Viktor Simkovic
(74) Attorney, Agent, or Firm—Thomas H. Close (57) ABSTRACT

A method of manufacturing a display module, including the steps of: providing a substrate; and forming on the substrate using the same manufacturing process an image display having an array of addressable display pixels and pixel driver circuitry responsive to control signals and image data for driving the pixels; and a digital signal processing circuit having an input interface over which image data and control signals are received; a frame buffer for storing image data and from which image data is read during a display refresh; a display matrix driver circuit for receiving image data from the frame buffer and supplies control signals to the pixel driver circuitry; a control circuit for coordinating storage, retrieval, and display operations, such that the display module is capable of display refresh independently of external control; and an image processing circuit for improving the visual perception of the displayed image.

30 Claims, 9 Drawing Sheets

SYSTEM FOR INTEGRATING DIGITAL CONTROL WITH COMMON SUBSTRATE DISPLAY DEVICES

FIELD OF THE INVENTION

The present invention relates to display devices and, more specifically, to flat panel display devices that are driven by external control signals.

BACKGROUND OF THE INVENTION

Conventional flat panel image display devices such as liquid crystal and LED display devices are controlled through the use of some interface, either analog or digital. In digital-processor based systems, these devices are then driven by digital/analog hybrid devices that drive the display and receive digital control signals from external computing devices. Additionally, image data must typically be buffered in some external memory device or devices.

Figure 1:
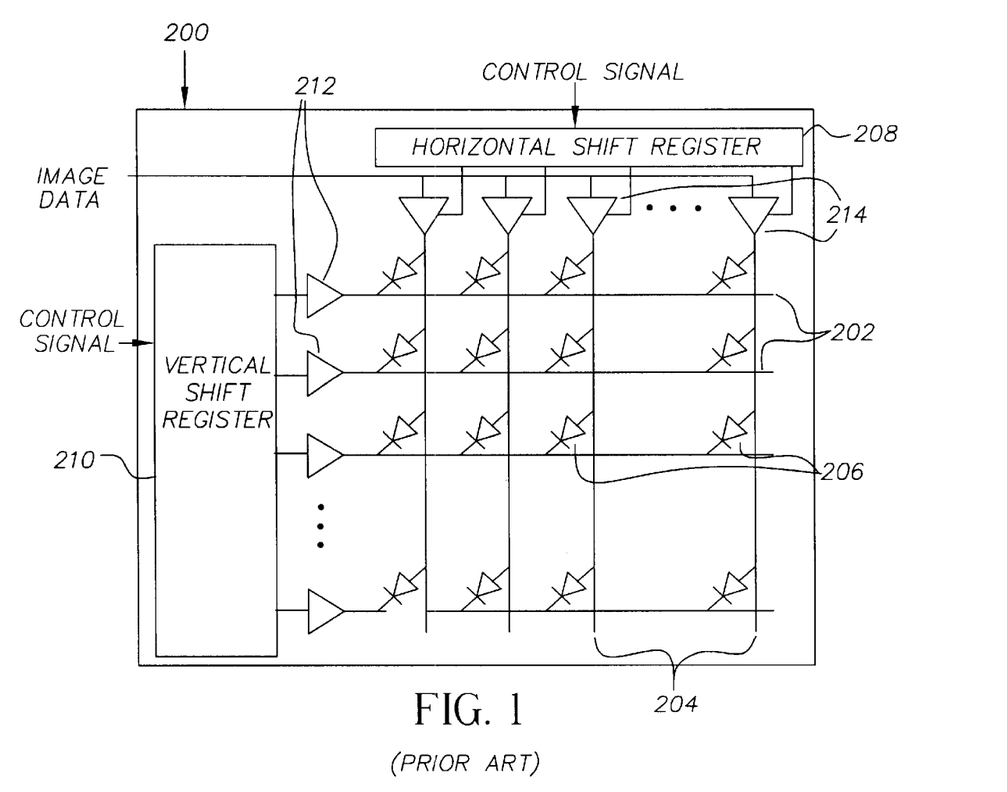
FIG. 1 is a circuit diagram of a flat panel display known in the prior art.

FIG. 1 shows a typical LED display device 200 that includes a grid of row 202 and column 204 addressing lines. A light emitting diode 206 is located at the juncture of each row and column addressing line. Pixel driver circuitry includes a column shift register 208 and a row shift register 210, and row and column drive amplifiers 212 and 214. In operation, image data and control signals are delivered to the row and column shift registers to control the drive amplifiers to produce an image on the display. LCD panels and other flat-panel display technologies employ similar device structures, where the pixel site light emitting diodes 206 are replaced by other light modulating technologies. However, the row and column addressing circuitry operates in a similar manner.

Figure 2:
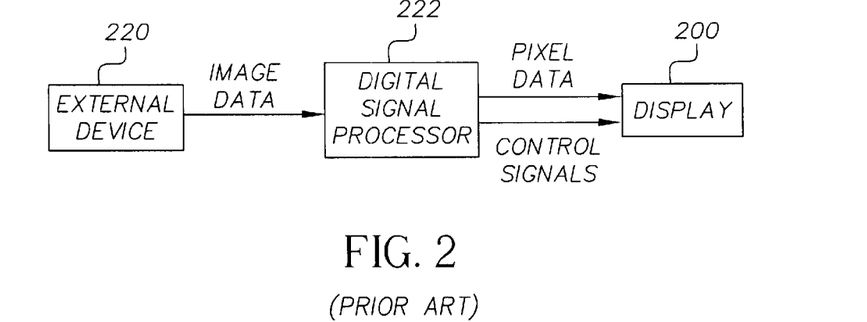
FIG. 2 is a diagram showing a typical imaging system known in the prior art.

Referring to FIG. 2, a typical display system includes an external device 220 that produces image data to be displayed. The image data is processed in digital signal processing circuit 222 that produces the control signals and data in a format that is useful to the display device 200.

A number of manufacturers offer driver integrated circuitry for driving flat panel displays, and other integrated circuits for processing digital image pixel data to improve the quality of displayed images. For example, the SED1355 controller offered by Seiko-Epson Corporation (Tokyo, Japan) is a generic controller that produces the proper timing of control signals for flat-panel display devices adhering to the various industry accepted liquid-crystal display and cathode ray tube standards (both digital and analog). Sony Corporation (Tokyo, Japan) manufactures a chip set to perform image processing and driving of its LCDs. The CXD2461 offered by Sony Corporation is a signal processor and timing generator containing various image processing functions such as brightness and contrast correction as well as gamma lookup correction capabilities. Image processing is performed on all pixel data in real time, as is required in video applications. However, for still images, the same pixel data is reprocessed every time the display device is refreshed. This is inefficient in processor usage and requires more complex circuitry and high data rates, consuming more power than necessary. The signal processor and timing generator also outputs various LCD timing signals for designated Sony LCD panels. The CXA2112R offered by Sony Corporation directly drives designated Sony LCD panels via analog signaling. These and other display drivers are physically separate from the display device and require a cable connection to transfer signals from the driver to the display as well as circuit board traces to transfer image data from the image processing circuitry to the driver chip. This has the disadvantages of increased system cost, size, complexity, and added susceptibility to noise. The need for two or more separate devices raises the cost of the system and makes it more complex to design, integrate, manufacture, and use. Often, a separate packaging step is required to integrate the driving device(s) and the display device.

U.S. Pat. No. 5,793,363, issued Aug. 11, 1998 to Takuwa describes a flat panel controller that buffers a frame of an image in a memory external to the display, drives the controller at a first clock frequency, and sends it to the flat panel for display at a second clock frequency.

U.S. Pat. No. 5,737,272 issued Apr. 7, 1998 to Uchiyama et al., discloses a device consisting of a display panel and a circuit substrate that may contain driver electronics mounted on such a display panel. However, the manufacturing process here requires at least three major sub-processing steps: manufacturing of the display panel, manufacturing of a driver electronics substrate, and the mounting and bonding of the driver electronics substrate on the display panel. This manufacturing process suffers from the inefficiencies of time and added cost for multiple assembly lines. U.S. Pat. No. 6,005,652 issued Dec. 21, 1999, to Matsuhira discloses a liquid crystal display device in which an integrated circuit is incorporated into an LCD panel. Once again, the additional manufacturing step of incorporating the integrated circuit is required to produce the display device.

U.S. Pat. No. 5,258,325 issued Nov. 2, 1993, to Spitzer et al., discloses a display device with digital circuitry on the same substrate. Here, the circuitry is formed on a first substrate, lifted off, and then transferred to a second display substrate. This is a difficult and costly manufacturing step.

Because some active matrix flat panel displays can be fabricated using a process common to that of integrated circuits, there is the opportunity to manufacture such a display containing highly integrated digital circuitry simultaneously. This display simplifies system design and increases system performance because it eliminates costly interconnects, decouples imaging functionality from the main processor, and can run more power efficiently.

U.S. Pat. No. 6,055,034 issued Apr. 25, 2000 to Zhang et al, discloses a "system-on-panel," where a liquid crystal display panel also contains peripheral driving circuits. These peripheral driving circuits include processor circuitry as well as memory. An earlier patent by Zhang (U.S. Pat. No. 5,995,189, issued Nov. 30, 1999) describes a manufacturing process by which such a "system-on-panel" may be produced.

Sharp-USA (Mahwah, N.J.) also has disclosed a "system-on-panel" concept. Such a device contains both pixel driver and controller circuitry on a common substrate.

Toshiba Corporation (Tokyo, Japan) has announced a liquid crystal display device that contains a single bit of memory located at each pixel site on a semiconductor substrate. This device exhibits the benefits of a self-refreshing display, decreasing system power consumption and improving system cost over more conventional flat panel display technologies. However, any image processing that could help improve the quality of the displayed image must be performed external to the device. This would require either an external processor of increased computational power, or other dedicated integrated circuitry. In either case, the system modularity is decreased, since a display-specific function is performed at a physically different location than the display itself. This could increase system debug time, as well as overall system cost, size, and complexity. The need for extra components or additional processing power elsewhere in the system often increases system power dissipation. Additionally, any extra power consumption implies increased current draw from the voltage sources. In battery-powered systems, the amount of operational time between battery recharges is decreased, making the system less usable and perhaps more expensive to run.

There is a need therefore for an improved method for manufacturing a "system-on-panel" display module to add image processing functionality, so that the image display quality is improved in a manner that also improves system modularity and usability for flat panel display-specific functionality, and lowers system parts counts and external processing requirements.

SUMMARY OF THE INVENTION

This need is met according to the present invention by manufacturing a display module, by providing a method of manufacturing a display module, that includes the steps of: providing a substrate; forming on the substrate using the same manufacturing process an image display having an array of addressable display pixels and pixel driver circuitry responsive to control signals and image data for driving the pixels; a digital signal processing circuit having an input interface over which image data and control signals are received; a frame buffer for storing image data and from which image data is read during a display refresh; a display matrix driver circuit for receiving image data from the frame buffer and supplies control signals to the pixel driver circuitry; a control circuit for coordinating storage, retrieval, and display operations, such that the display module is capable of display refresh independently of external control; and an image processing circuit for improving the visual perception of the displayed image.

ADVANTAGES

By including image processing on the common substrate, the current invention has the advantages of increased modularity, reduced complexity, decreased system part count, and a simpler interface between an external image source and the display device.

DETAILED DESCRIPTION OF THE INVENTION

Figure 3:
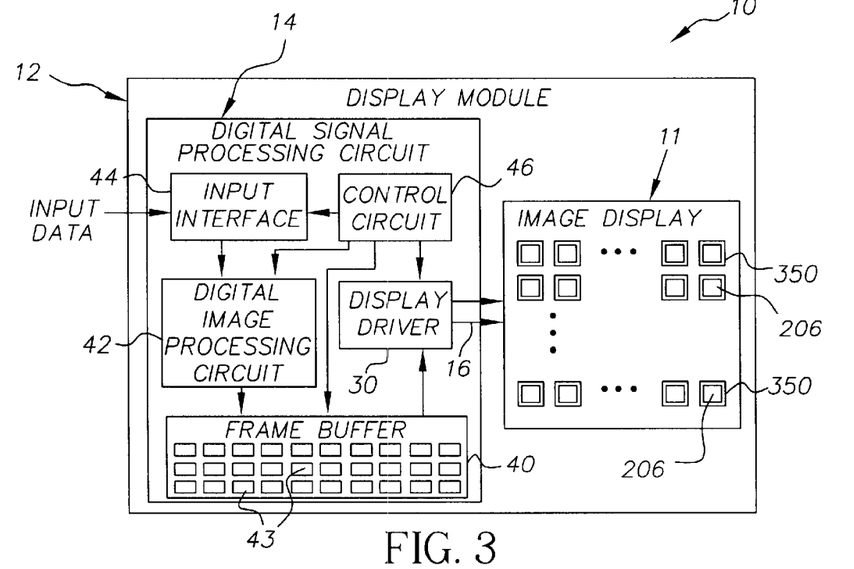
FIG. 3 is a diagram showing the components of a display module manufactured by the method of the present invention.

Referring to FIG. 3, a display module, generally designated 10, is manufactured according to the present invention by the integration of an image display 11 and a digital signal processing circuit 14 that includes: a display driver 30; a frame buffer 40; an input interface 44; a control circuit 46 capable of refreshing the image display 11 from the frame buffer 40; and a digital image processing circuit 42, on a common substrate 12 with the image display 11. Frame buffer 40 consists of frame buffer memory elements 43 capable of storing a digital image data value. According to a preferred embodiment, the image display 11 is an organic electroluminescent display, with light emitting diode pixels 206 at pixel locations 350, that is formed using a conventional integrated circuit manufacturing process, in which the image display is formed on the substrate 12 using the same manufacturing process as is used for producing the digital signal processing circuit 14.

The formation of the digital signal processing circuitry 14 on the same substrate 12 as the image display 11 and the capability of the control circuit 46 to refresh the image display 11 without the use of control signals or data produced external to the display module 10, provides power savings over multiple discrete devices because the display module circuitry may be driven at lower core voltages on a single substrate without the need for translation to higher voltages for improved noise margins when going off-chip. Such voltage translation is then eliminated between the image display 11 and a separate display driver, between the display driver 30 and a separate frame buffer, and between the frame buffer 40 and a separate digital image processing circuit.

Additionally, signal transmission within a single device does not require the higher current drive levels for signals driven off-chip, further reducing power consumption. A circuit architecture where digital image processing is performed prior to image data storage minimizes the number of total operations performed over a number of still-image refreshes of the image display 11, potentially making the digital image processing clock rate less than the display pixel clock rate. This further decreases the amount of power consumption in such an imaging system.

According to one embodiment, the manufacturing method of the present invention is started by preparing the surface of the substrate 12, e.g. glass, by cleaning, smoothing, and polishing. Metal interconnections may then be deposited on the substrate 12 followed by a thin film of silicon. Photolithographic techniques are used to pattern the silicon creating the digital circuitry necessary to implementing the digital signal processing circuitry 14 and removing the silicon in areas where light emitting pixels of the image display 11 are to be placed.

Further deposition is performed to create the active components, insulating components, and connections. Ion implantation is performed to dope the appropriate components in typical configurations. Transparent conductors are deposited on the substrate 12 in the areas where the light emitting pixels are to be placed and were previously etched free of the thin-film silicon. The last layer deposited covers all of the silicon and active device areas on the substrate 10 except the transparent conductors.

The transparent conductors are then cleaned using a plasma in a vacuum chamber to react with impurities to form an ash which can be washed away. Once the transparent conductors are cleaned, light emitting materials, such as organic light emitting diode materials, can be deposited. To do this, a mask is placed over the substrate 12, obscuring everything but the transparent conductors as closely as possible. The assembly is then placed in a vacuum chamber and exposed to heated emissive material that sublimes and coats the transparent conductors. Various materials are coated in sequence and on different portions of the substrate 12 to obtain the various colors, and to optimize performance of the light emitting diodes. Once these depositions are concluded, the device is enclosed with a cover and sealed with an epoxy glue.

In a preferred embodiment, the invention is employed in an image display 11 that includes Organic Light Emitting Diodes (OLEDs), which are composed of small molecule polymeric OLEDs, as disclosed in, but not limited to, U.S. Pat. No. 4,769,292, issued Sep. 6, 1988 to Tang et al., and U.S. Pat. No. 5,061,569, issued Oct. 29, 1991 to VanSlyke et al. This technology provides a technical platform on which an integrated image display module can be constructed. Many combinations and variations of OLED can be used to fabricate such a device. OLED devices can be integrated in a micro-circuit on a conventional silicon substrate 12 and exhibit the necessary characteristics. Alternatively, OLED devices may also be integrated upon other substrate materials, such as glass or steel having a pattern of conductive oxide and amorphous, polycrystalline, or continuous grain silicon material deposited thereon. The deposited silicon materials may be single-crystal in nature or be amorphous, polycrystalline, or continuous grain. These deposited materials and substrates are known in the prior art and this invention, and may be applied equally to any micro-circuit integrated on a suitable substrate.

The topological organization, or layout, of the circuitry can be optimized to enhance the performance of the display module 11. The use of a common semiconductor manufacturing process makes such topological organization possible, and allows the digital signal processing circuit 14 to be mixed with the elements of the image display 11. Various circuit topologies can be constructed, optimizing the characteristics of the display module as desired, accounting for area usage, pixel fill factor, interconnect delays, pixel response time, noise, cost, digital signal processing circuit 14 complexity, display module 11 design time, display module 11 manufacturing yield, and display module 11 packaging.

In the embodiment shown in FIG. 3, the digital signal processing circuit 14 and the image display 11 are formed on different areas of the substrate 12 and interconnects 16 between the digital signal processing circuit 14 and the image display 11 are also formed on the common substrate 12 in the same manufacturing process. This embodiment has the advantage of decoupling the digital signal processing circuit 14 from the image display 11, which is most amenable to the current commonly used design and manufacturing processes. Digital signal processing circuitry 14 is generally designed using different fabrication design rules than the image display 11. Separating circuitry designed according to different design rules makes the manufacturing process easier to control and therefore maximizes display module 10 yields. Additionally, the use of uniform design rules over a substrate area makes the circuit more spatially regular thereby increasing the area use efficiency by allowing a more dense deposition of circuit elements than mixing circuitry of different design yields would allow. This, in turn, has the potential of reducing cost for the display module 10.

Figure 4:
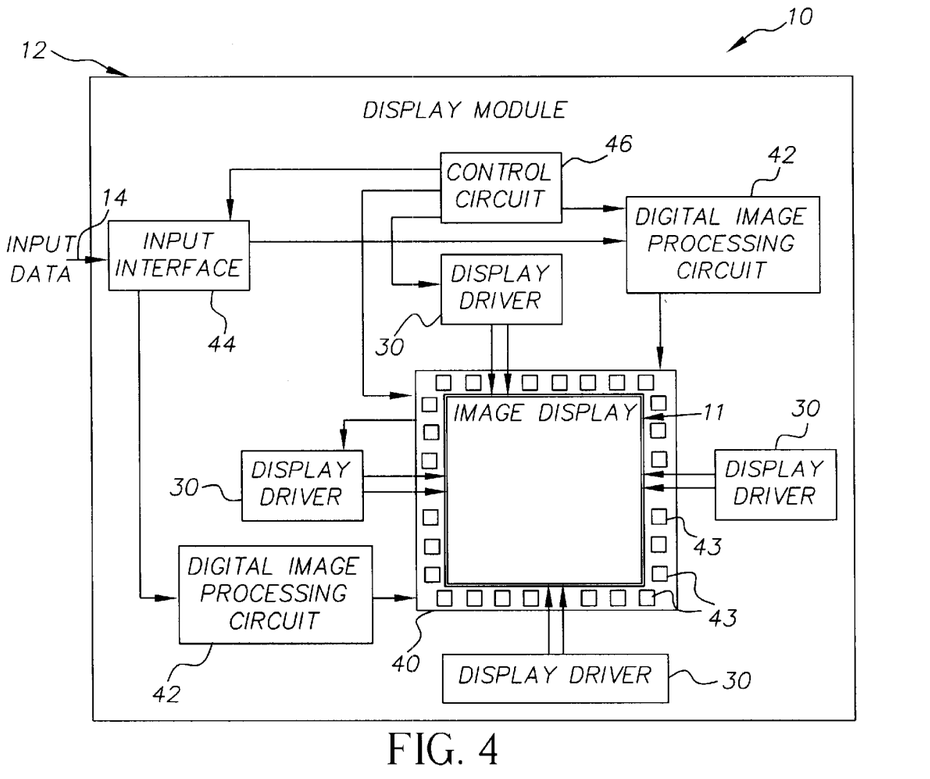
FIG. 4 is a diagram showing a block placement of an embodiment of the present invention, where the digital signal processing circuit is placed on the periphery of the image display to improve pixel response time and to provide efficient layout with reduced power needs and improved signal integrity.

According to an alternative topological embodiment shown in FIG. 4, the digital signal processing circuit 14 is physically placed around the periphery of the image display 11 on the common substrate 12. The circuitry is arranged to increase circuit response time, but still separate the image display 11 and the digital signal processing circuit 14. Typically, the frame buffer memory elements 43 that comprise the frame buffer 40 are placed to minimize interconnect delays between the frame buffer memory elements 43 and the light emitting diode pixels 206 within the image display 11. The digital image processing circuit 42, the control circuit 46, the input interface 44 circuitry, and the display driver circuit 30 are then placed around the frame buffer 40 in a manner that allows the frame buffer 40 to be driven efficiently. The digital image processing circuit 42, the control circuit 46, and the display driver circuit 30 may physically exist in a multiplicity of nonadjacent parts, but together provide the functionality described in this disclosure. Placing circuitry in a way that minimizes interconnect delays increases circuit response time, decreases signal loss and noise gain in interconnects, and decreases interconnect line widths, therefore decreasing cost.

Figure 5:
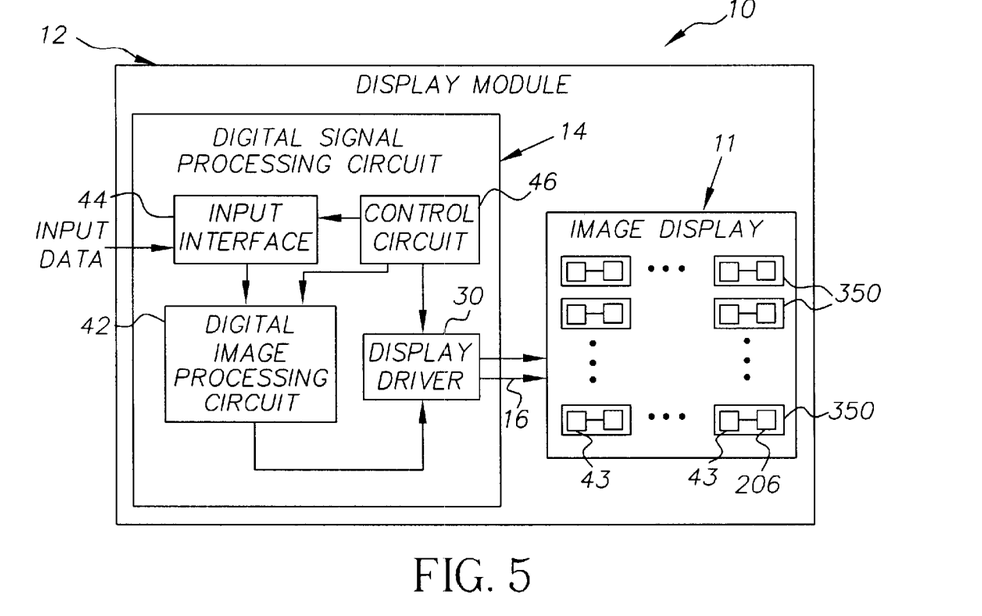
FIG. 5 is a diagram showing a block placement of an embodiment of the present invention, where the frame buffer memory elements are embedded within the image display at light emitting elements to improve pixel response time layout with reduced power needs and improved signal integrity.

Another topological embodiment is shown in FIG. 5. Here, the image display 11 contains pixel locations 350. Each pixel location 350 contains some portion of the digital signal processing circuit 14, most typically the frame buffer 40, and a light emitting diode 206. This embodiment has the advantage that the digital signal processing circuit 14 can process digital image data or offer pixel control local to the actual light emitting diodes 206, storing results at the pixel locations 350, thereby allowing for faster access to processed digital image data by the display pixels. This can potentially offer faster operating speeds and add less noise to the image data, since the interconnect lengths are shorter.

Figure 6:
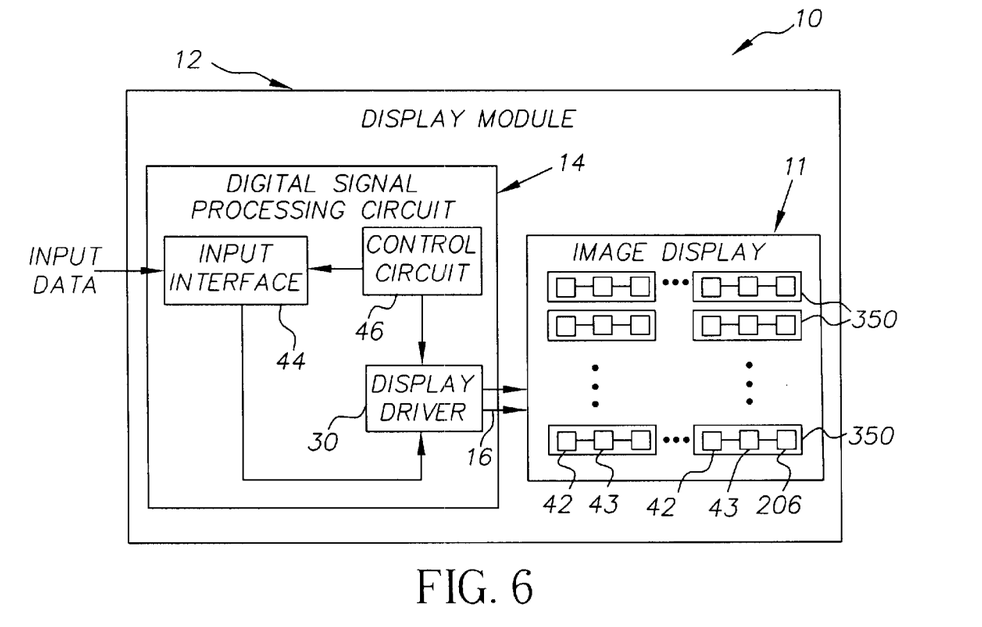
FIG. 6 is a diagram showing a block placement of an embodiment of the present invention, where the digital image processing circuit and frame buffer memory elements are embedded within the image display at each light emitting element, improving image data processing parallelism and pixel response time, and lower clock rates.

Different granularities of such intermixing may be used to achieve various design goals. FIG. 6 shows one such topological embodiment, where each pixel location 350 may have its own digital image processing circuit 42. This embodiment provides the maximum amount of digital image processing parallelism, with the tradeoff of increased logic complexity, allowing for the greatest amount of displayed digital image data improvement. Or, the same image processing functionality as the embodiment of FIG. 3 is allowed, but with the circuitry operating at lower clock rates, allowing savings in dynamic power consumption.

Figure 7:
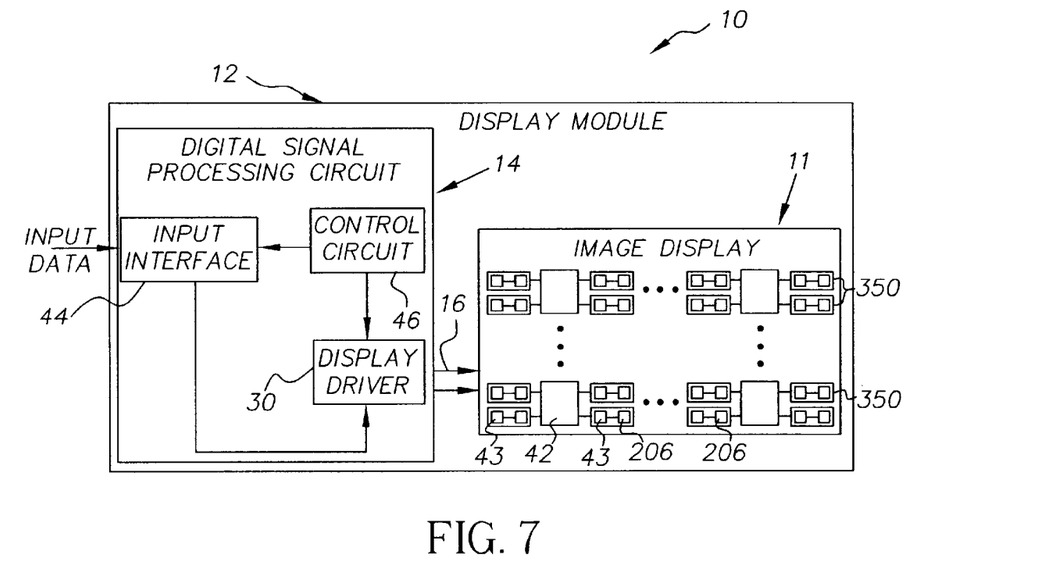
FIG. 7 is a diagram showing a block placement of an embodiment of the present invention, where the digital image processing circuitry and frame buffer memory elements are embedded within the image display such that a single digital image processing circuit drives some subset of frame buffer memory elements located at each light emitting element, improving image data processing parallelism and pixel response time, while utilizing as much substrate area.

FIG. 7 shows a topological embodiment where a group of pixel locations 350 share a single digital image processing circuit 42, where multiple digital image processing circuits 42 are embedded physically within the image display 11 This embodiment shares the advantages of the embodiment of FIG. 6 with the duplication of the digital image processing circuit 42 and its locality to the pixel locations 350, but consumes less substrate area, thereby decreasing manufacturing complexity.

Figure 8:
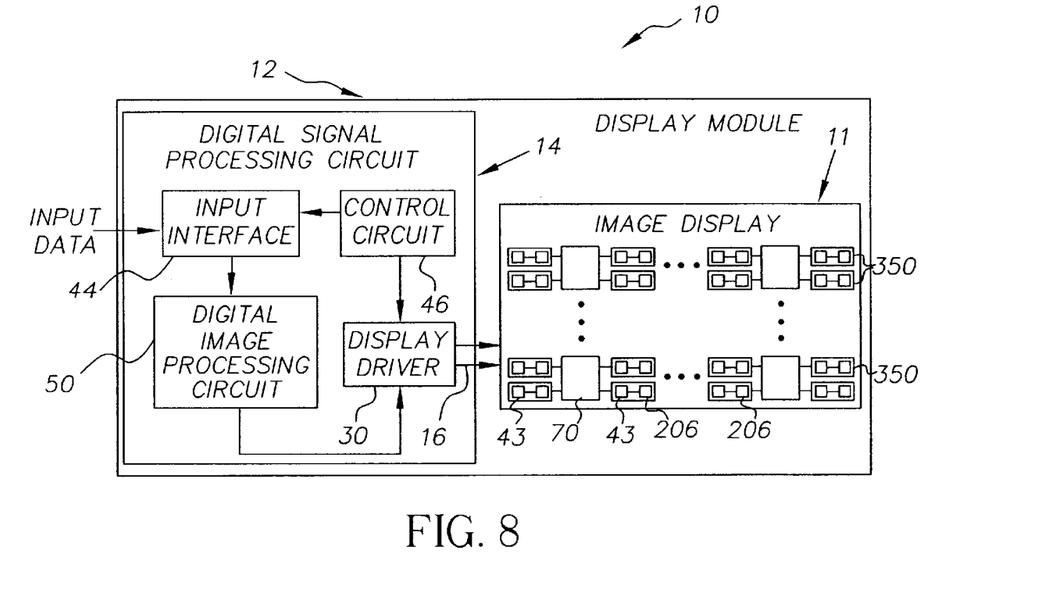
FIG. 8 is a diagram showing a block placement of an embodiment of the present invention, where a first portion of the digital image processing circuit is placed on a different area of the substrate than the image display, and where a second portion of the digital image processing circuitry and frame buffer memory elements are embedded within the image display such that a single digital image processing circuit drives some subset of frame buffer memory elements located at each light emitting element, improving image data processing parallelism and pixel response time, but reducing clock rate.

According to a further alternative embodiment, only a portion of the digital image processing circuit 42 is intermixed with the elements of the image display. FIG. 8 shows such a topological embodiment. Here, the input interface 44 and a first portion 50 of the digital image processing circuit 42 are located in one area of the substrate 10, but the frame buffer memory elements 43, which together form the functionality of frame buffer 40, and a second portion 70 of the digital image processing circuitry are located at the pixel locations 350 in the image display 11. The results of the first portion 50 of the digital image processing circuit 42 are sent to the image display 11 via the display driver 30. Interconnects within the image display 11 send the data to the appropriate digital signal processing circuit 70. The display driver 30 coordinates this image data routing. This embodiment is useful for applications in which the digital image processing circuit operations can be divided into two distinct parts. The first part is defined by operations that are repetitive on each individual digital image data value, and not dependent on neighboring digital image data values. These operations are performed by the first portion 50 of the digital image processing circuit 42, and include contrast, brightness, and gamma correction. The second part is defined by operations that correct actual image display 11 defects or that are in some way dependent on neighboring digital image data values. These operations are performed by the second portion 70 of the digital image processing circuit 42, and include pixel defect correction and pixel luminance uniformity correction. The second part is defined by operations that correct actual image display 11 defects or that are in some way dependent on neighboring digital image data values. It then becomes convenient to locate the frame buffer memory elements 43 near the second portion 70 of the digital image processing circuit 42. Parts of the digital signal processing circuit 14 not relating to specific pixels, rows, or columns, are formed on a separate region of the substrate 12 to optimize the communication speeds of the pixel-specific logic and display elements, by minimizing routing complexity.

The remainder of this discussion focuses on the logic functionality implemented on the substrate 12, and is not concerned with the topology in which it is implemented. It is assumed that the logic is implemented in a topology that maximizes the effectiveness of the overall display module 10 according to design requirements, such as logic functionality, clock speed, cost, routing complexity, fill factor, manufacturing process yields, or packaging requirements.

FIG. 3 shows the electronic functionality of one embodiment of a color display module 10 formed on a common substrate 12 according to the present invention. The digital signal processing circuit 14 includes a display driver 30 that provides image data and control signals to the color image display 11 at the proper time so that the image is displayed on the image display 11. The digital signal processing circuit 14 includes a frame buffer 40 having storage locations for the color image data for each pixel and digital image processing circuit 42 to modify the image, for example so that it looks more pleasing to the observer than the unmodified image. The digital signal processing circuit 14 also contains an input interface 44 for receiving image data from an external device and supplying the image data to a digital image processing circuit 42, The digital signal processing circuit 14 also includes a control circuit 46 for coordinating the operation of the other digital circuitry components in the digital signal processing circuit 14, and a display driver 30 that sends image pixel data and control signals to the image display 11 in a format suitable for it.

The input interface 44 may be used to connect to signals in various physical formats. These formats include digital electronic signals transmitted via copper wire, photonic signals transmitted via optical wire or via a wireless means, and electromagnetic signals transmitted via some wireless radio frequency standard, in which case the input interface 44 includes a radio receiver. The input interface 44 is usually capable of two-way communications so that status, error, and handshaking messages and feedback can be transmitted to the source of image data.

Figure 9:
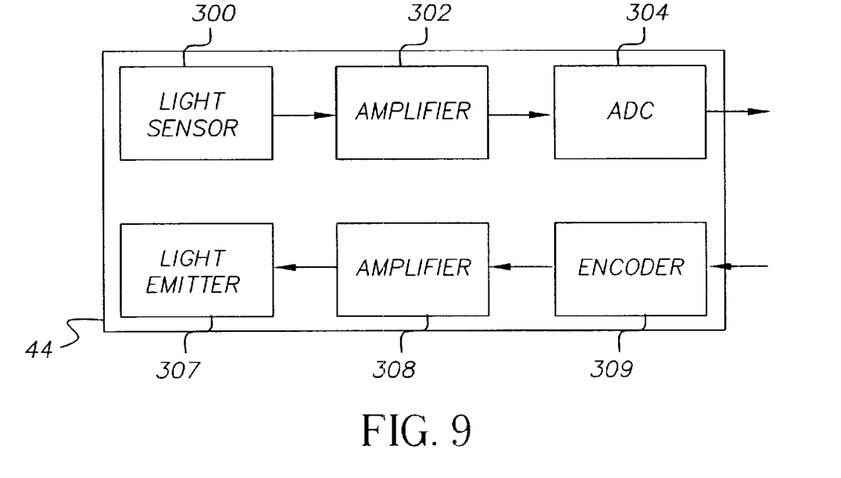
FIG. 9 is a diagram showing an input interface implemented for IR communication.

FIG. 9 shows an implementation of the input interface 44 where data is received via wireless photonic means such as an IR transponder. A light sensor 300 senses input light and converts it to an analog electric signal, either current or voltage. This analog electric signal is converted to a digital signal by using an amplifier 302 and an analog-to-digital converter (ADC) 304. The resulting digital information is used as digital control signals and digital image data by the digital signal processing circuit 14. Feedback is accomplished using an encoder 309 to encode the various control signals and messages into a time or intensity modulated form. A digital-to-analog conversion may occur in the encoder 309. The resulting voltage is amplified and filtered by an amplifier 308, and transmitted optically to the image data source by a light emitter 307. The feedback control signals are generated by the control circuit 46.

Figure 10:
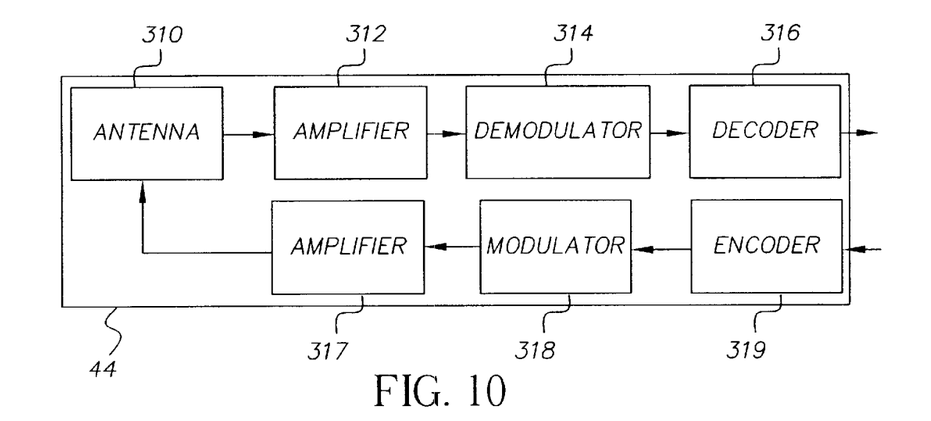
FIG. 10 is a diagram showing an input interface implemented for RF communication.

FIG. 10 shows an implementation of the input interface 44 where data is received electromagnetically. Electromagnetic communications includes radio frequency (RF) and microwave communication. Here, an antenna 310 receives the electromagnetic signal in the radio frequency or microwave ranges. The electromagnetic signal received by the antenna 310 is typically amplified and filtered by amplifier 312. The information content is extracted from the amplified signal by a demodulator 314 and decoded by a decoder 316. The decoder 316 often includes a decision circuit for mapping noisy received signals into known digital code values that represent digital information. The resulting digital information is used as digital control signals and digital image data by the digital signal processing circuit 14. Feedback is accomplished using an encoder 319 to encode the various control signals and messages into a time or intensity modulated form. A digital-to-analog conversion may occur in the encoder 319. The resulting voltage is modulated onto some carrier frequency by a modulator 318. The resulting modulated signal is amplified and filtered by an amplifier 317, and transmitted electromagnetically to the image data source by the antenna 310. The feedback control signals are generated by the control circuitry 46.

Figure 11:
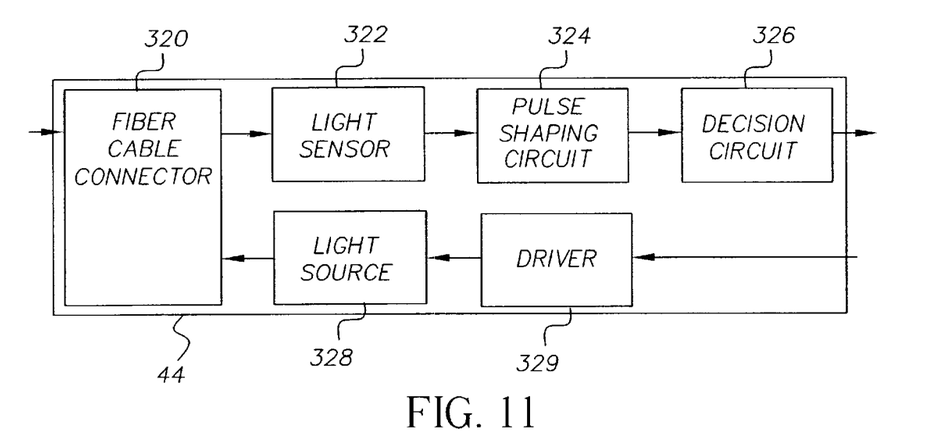
FIG. 11 is a diagram showing an input interface implemented for fiber optical cable reception.

FIG. 11 shows an implementation of the input interface 44 where data is received via an optical wire means. An optical cable is plugged into an optical cable connector 320. Light representing digital image data and control signals is sent from an image source and is transmitted via this optical cable, received at the optical cable connector 320 and sensed by a light sensor 322. The light sensor 322 outputs an electronic signal representing the sensed light. A pulse shaping circuit 324 amplifies, filters, and perhaps decodes this electronic signal and extracts timing information. A decision making circuit 326 then takes this electronic signal and timing information and determines digital code value for the received signal. The resulting digital information is used as digital control signals and digital image data by the digital signal processing circuit 14. Control signal feedback may be sent to the image source via the same optical cable connected to optical cable connector 320. The signals from the control circuit 46 are brought into a driver circuit 329, which converts the control signal voltages into current pulses. These current pulses then modulate a light source 328. The light output by the light source 328 is transmitted to the optical cable via the optical cable connector 320.

The input interface 44 accepts image data and control signals that coordinate the timing of this image data transfer to display module 10. The input interface 44 may also accept control information, such as coefficients used in image processing, and commands for initializing the input interface 44 to perform as desired in implementations where the display module 10 is designed to operate in more than one manner. Image data and control information may be differentiated either by using different physical conductors or wavelengths for transmission, or by using some predefined encoding/decoding scheme when common conductors or wavelengths are used to carry control and image data information in a time multiplexed manner.

The input interface 44 may be either synchronous or asynchronous, and may receive data at varying rates. Additionally, the input interface 44 may be a serial interface (able to accept one bit at a time), or a parallel interface (able to accept multiple bits simultaneously). A parallel interface, in general, may accept any desired number of bits simultaneously, but more commonly may accept some number of complete image data color values simultaneously. It may accept one image data color value at a time, which is the same as one pixel at a time in monochrome display implementations. Or, for multicolor displays, the interface may accept a multiplicity of image data color values simultaneously such that the number of image data color values equals the number of colors that the image display is capable of displaying, or a multiplicity of full pixels simultaneously.

Figure 12:
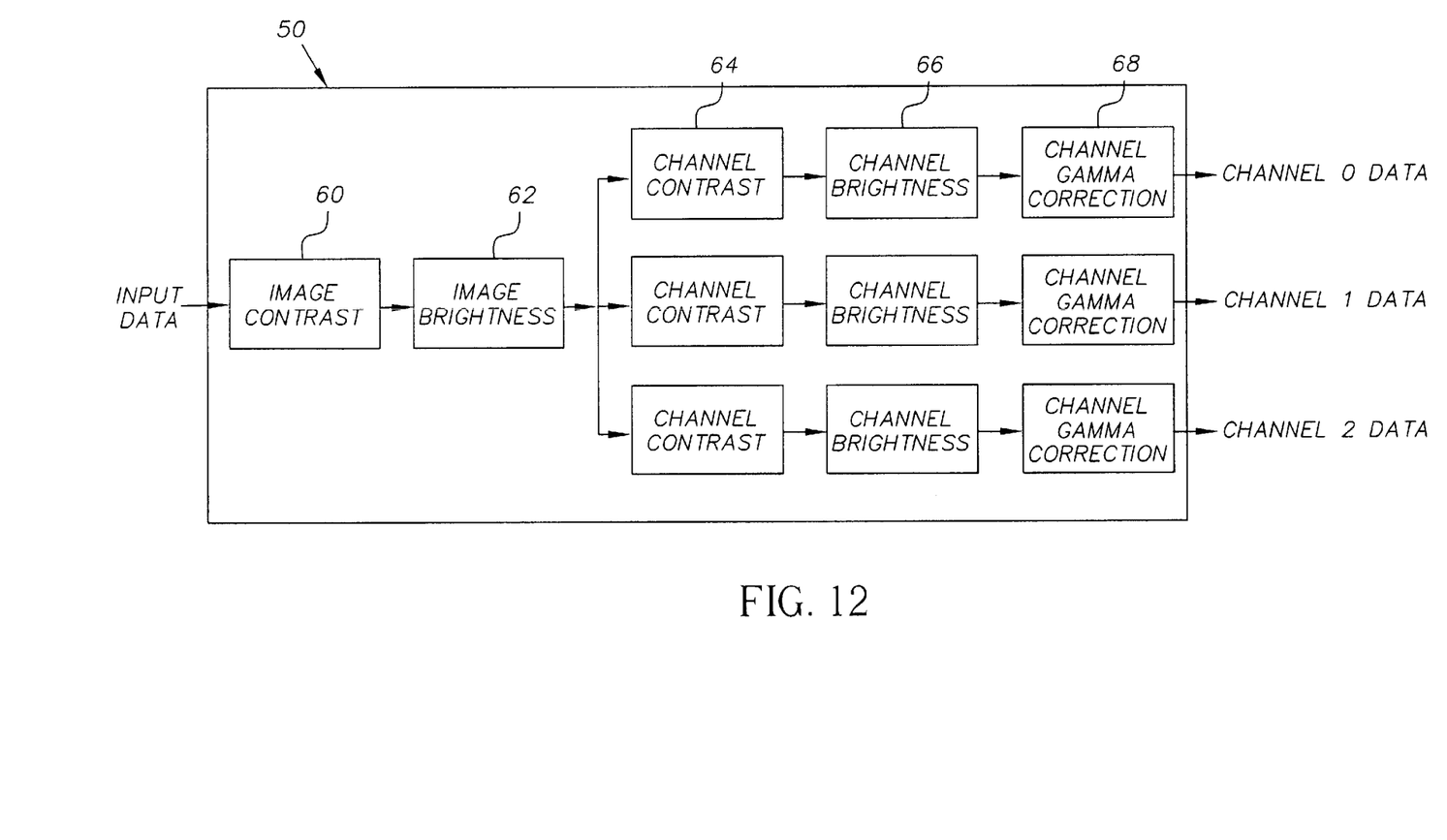
FIG. 12 is a diagram showing digital image processing functionality in a preferred embodiment of the present invention.

FIG. 12 shows one embodiment of the digital image processing circuitry 42 for the display module embodiment shown in FIG. 3. This implementation includes circuitry to modify the image contrast 60 and brightness 62, typically through table lookup logic or through scaling and shift operations. The same operations can be applied to each individual color channel, 64 and 66. Image gamma correction circuitry 68 corrects the image gamma, and may be a lookup table or some implementation of a mathematical calculation. This embodiment operates at the input image data rate. The digital image processing operations are performed on the digital image data prior to storage in the frame buffer 40. For still images, the digital image data passes through the digital image processing circuit 42 only once, no matter how many times the same digital image data is used to refresh the image display 11. The display refreshes use digital image data read from the frame buffer 40. Therefore, the digital image processing circuit 42 can operate at a slower clock rate and possibly disabled while the image display 11 is being refreshed from previously processed and buffered data and no new image data is being brought into the display module 10.

Figure 13:
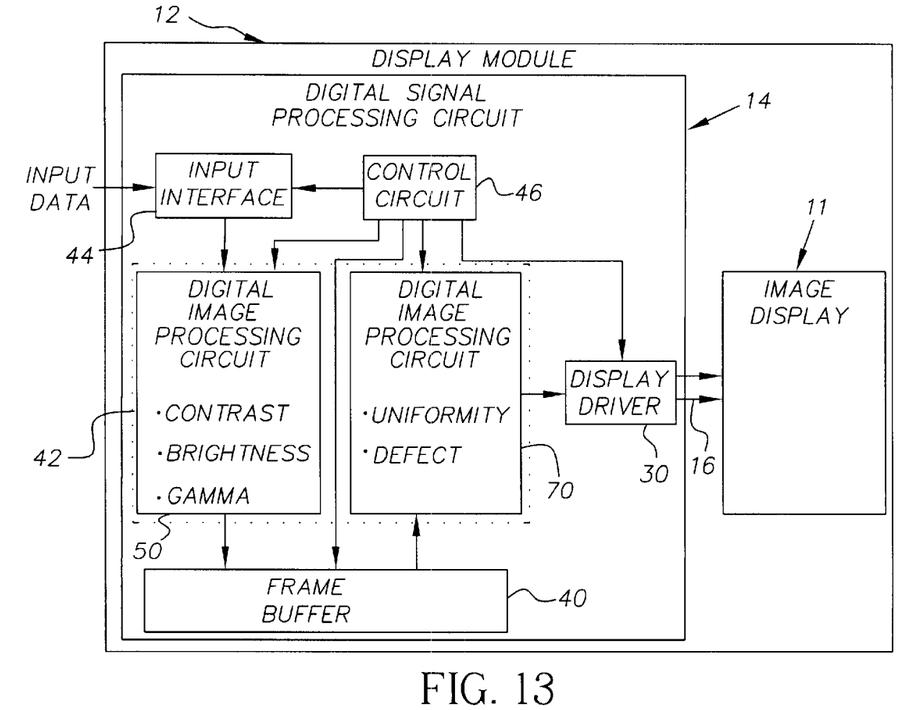
FIG. 13 is a diagram showing the digital image processing circuitry implemented in two blocks to take advantage of differing clock rates and minimizing power consumption, in a preferred embodiment of the present invention.

The digital image processing circuitry 42 may include additional functionality, including pixel luminance uniformity correction, and pixel defect correction. FIG. 13 shows one such implementation. Here, the same substrate 12, digital signal processing circuit 14, and display module 10 are illustrated. However, the image contrast, brightness, and gamma correction performed by a first area of the digital image processing circuit 50 while a second area of the digital image processing circuit 70 is used for pixel luminance uniformity correction, and pixel defect correction. In this embodiment, the input image data rate is less than the image data rate of the display driver 30. The digital image processing is performed on digital image data at a lower data rate to save dynamic power dissipation and enabling all image data to be processed once, despite the number of times it must be refreshed. Some, or all, of the digital image processing circuitry 42 could be located closer to the display driver 30, and run at the higher image display 11 refresh clock rate. This could increase power dissipation and complicate manufacturing, but may be necessary for operations that might depend on the values of a multiplicity of pixels, where it is necessary to have a number of these pixels buffered. This may occur for some pixel uniformity correction and pixel defect correction algorithms.

Some multiplexing logic may be necessary to interface the digital image processing functions to the frame buffer 40, depending on the number of banks in the frame buffer 40 and amount of parallelism present in the input interface 44 and display interconnect 16. The digital image processing algorithms implemented by the digital image processing circuitry 42 may be implemented in a number of different ways, including, but not limited to, firmware executed in an embedded digital signal processor or micro-controller core, hard-wired digital logic circuitry, embedded programmable logic circuitry, or embedded look-up tables.

Figure 14:
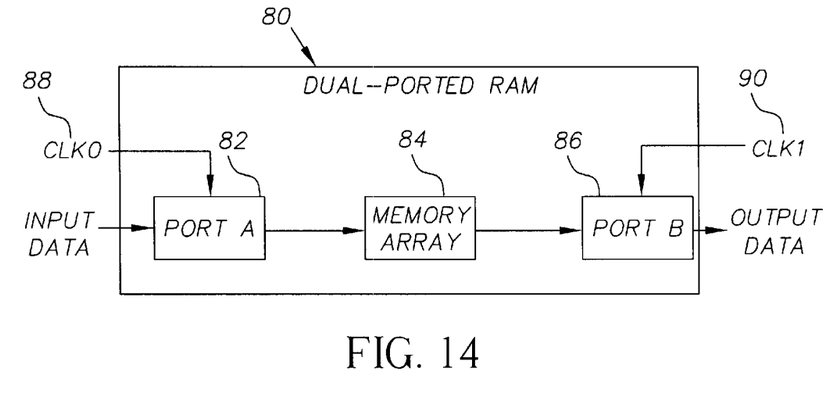
FIG. 14 is a diagram showing the implementation of the frame buffer circuit using dual-ported synchronous memories in the present invention.
Figure 15:
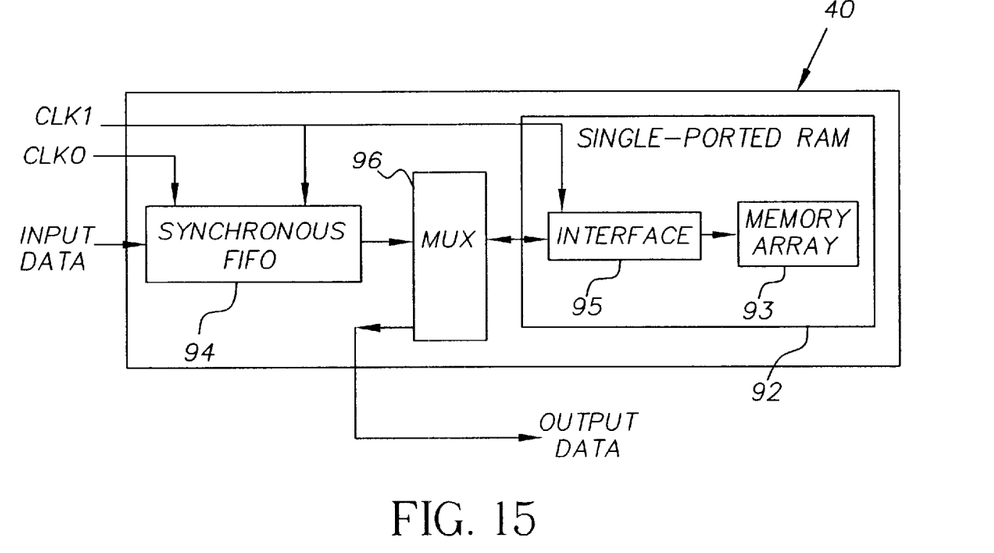
FIG. 15 is a diagram showing the implementation of the frame buffer circuit using a synchronous FIFO and a single-ported synchronous memories in the present invention.

In general, the image display 11 data rate differs from the input interface 44 data rate; the input interface 44 image data rate is less than or equal to the image display 11 image data rate. This leads to the decreased dynamic power dissipation exhibited by the invention. In such a case, the frame buffer 40 is required to provide the storage necessary for the digital image data to persist while the differing clock rates are bridged. Referring to FIGS. 14 and 15, alternative ways of interfacing the frame buffer 40 to the digital image processing circuitry 42 and display driver circuit 30 are shown. As shown in FIG. 14, the frame buffer 40 may consist of dual-ported RAM 80 that can handle differing clock rates for each memory interface. In FIG. 14, digital image data is sent by an input port 82 to a memory array 84. There, the digital image data is temporarily stored and then passed to an output port 86 when needed for display on the image display 11. When needed for display, the display driver circuit 30 fetches the digital image data from the memory array 84 via the output port 86. The ports 82 and 86 are clocked at different rates 88 and 90 for the input and output ports. Alternatively, as shown in FIG. 15, a single-ported RAM design 92 with a synchronous FIFO 94 can be used to implement the frame buffer 40. The single-ported RAM 92 contains a memory array 93 in which digital image data is stored and an interface 95 to a multiplexer 96. Incoming digital image data passes through a synchronous FIFO 97 at a lower clock rate CLK0. Digital image data is read from the FIFO 97 at a higher clock rate CLK1, which is equal to image display 11 refresh clock rate. Multiplexer 96 routes the data accordingly, depending upon if input or displayed image data is being utilized at a given moment. Directional control, FIFO control, and memory control are provided by a control block (not shown). Other memory buffering schemes that allow bridging of differing clock frequencies are well known to those skilled in the art.

The frame buffer 40 is also useful in providing a local storage location for digital image data that must be used to periodically refresh or update the image display 11. The frame buffer 40 is usually implemented in a multiplicity of memory banks, where the number of memory banks is typically equal to either the number of color channels that the image display 11 is capable of displaying. Alternatively, the number of memory banks within a frame buffer 40 may equal the number of channels that the image display 11 is capable of having driven simultaneously, when this number is not equal to the number of color channels.

A multiplicity of frame buffers 40 may be implemented in cases where it is desired to fill one memory bank with new digital image data while the image currently being displayed on the image display 11 is read from a different frame buffer 40. This allows for a more graceful change of source images, since all digital image data can be present at the time of image change. This also allows the input interface 44 to operate more slowly or for the input digital image data to arrive at slower, variable, and non-deterministic rates without inducing an intermittent quality to the transition of the displayed image that viewers may find objectionable. The memory bank selected for image data input and for image display 11 refresh is controlled by the control circuit 46. The display driver 30 operates at a clock rate sufficient to supply digital image data to the image display 11 so that an image may be displayed without flicker that is objectionable to the viewer. The display driver 30 is capable of driving the image display 11 in a manner electrically conducive to displaying good quality images. The number of driving lines present is equal to the number of driving lines that the image display 11 expects to receive. The display interconnect 16 itself is built in the substrate 12 in the same manner and in the same manufacturing step as are the image display 11 and the digital signal processing circuit 14. The display driver 30 may contain a digital-to-analog converter to produce analog signals for image displays 11 that expect analog drive, or may contain a digital interface for image displays 11 that expect digital drive. Some form of data multiplexing may be necessary to properly route digital image data from the frame buffer 40 or digital image processing circuitry 42 to image display 11.

The control circuit 46 provides a mechanism to control the overall operation of the circuitry within the display module 10. This includes the coordination of the various modules, including the input interface 44, the digital image processing circuit 42, the frame buffer 40, and the display driver 30. This also includes the routing of digital image data through the circuitry, the refresh rate and refresh functionality of the display module 10, and the setting of various control registers, status bits, and image processing coefficients. Note that the control circuit 46 allows the display module 10 to refresh the image display 11 without any intervention from circuitry external to the display module. Such functionality decouples the image display functionality from the remainder of the system, and minimizes the number of operations such external circuitry must execute with respect to system display functions. The external circuitry may therefore be simplified, reducing its cost, and run at a lower clock frequency, reducing its dynamic power dissipation.

The digital signal processing circuit 14 is then entered into the design for the display module 10 and is manufactured through the same process. The end result is a display module 10 containing an image display 11 with the associated digital signal processing circuitry 14 necessary to process an image in some form and to sustain a visual image on the image display for viewing.

Flat-panel display systems are known for requiring multiple voltages for proper display operation. For example, OLED image displays 11 require a bias voltage for the thin film transistors, a bias voltage for the storage capacitor, a bias voltage for the diode anode, a bias voltage for the diode cathode, and a ground. Additionally, the digital signal processing circuit 14 requires one or more of its own bias voltages, typical of those commonly used in integrated circuit design. All of these voltages must be generated somewhere within the imaging system, whether internal or external to the display module 10.

Figure 16:
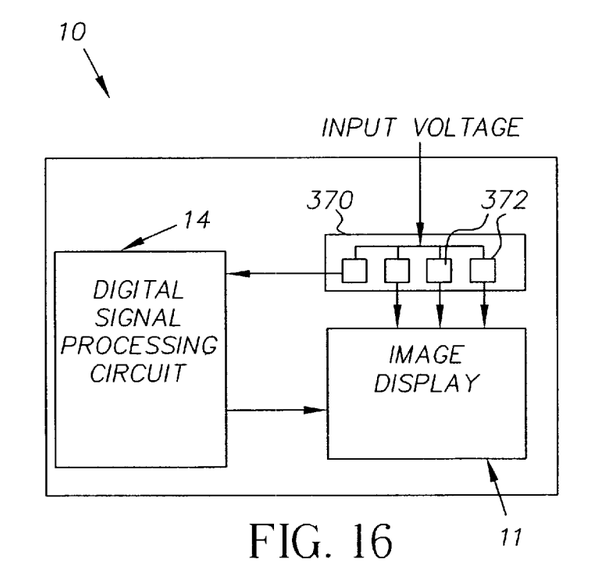
FIG. 16 is a diagram showing the voltage generation functionality in a preferred embodiment of the present invention.

One embodiment of the present invention generates one or more of these required voltages using a voltage regulator or voltage reference located on the display module 10 from another voltage brought onto the display module 10 via a connector. FIG. 16 shows an embodiment of such a display module 10. The display module 10 contains a digital signal processing circuit 14, an image display 11, and a voltage generation circuit 370. The voltage generation circuit 370 contains one or more voltage generators 372 that generate one or more voltages different from the voltage or voltages generated external to the display module 10 and brought into the display module 10 via its input connector. These voltages are distributed to the digital signal processing circuit 14 and the image display 11 as needed via interconnects formed on the common substrate 12. The voltage generation circuit 370 is manufactured simultaneously with the digital signal processing circuit 14 and the image display 11. The use of the voltage generation circuit 370 reduces the number of separate voltages that must be brought into the display module 10. This reduces the cost of the input connector and associated cables, eliminating the need for, and therefore the cost of, external voltage regulators and voltage references on the circuit board. This reduces system noise and complexity.

To minimize the number of conductors required to bring externally generated voltages onto the display module 10, a single voltage is generated externally and brought onto the display module 10. All other voltages required by the display module 10 are then generated by the voltage generators 372 within the voltage generation circuit 370.

A tradeoff of the number of voltage generators 372 contained within the voltage generation circuit 370 may be necessary due to area and power dissipation constraints on the common substrate 12.

Figure 17:
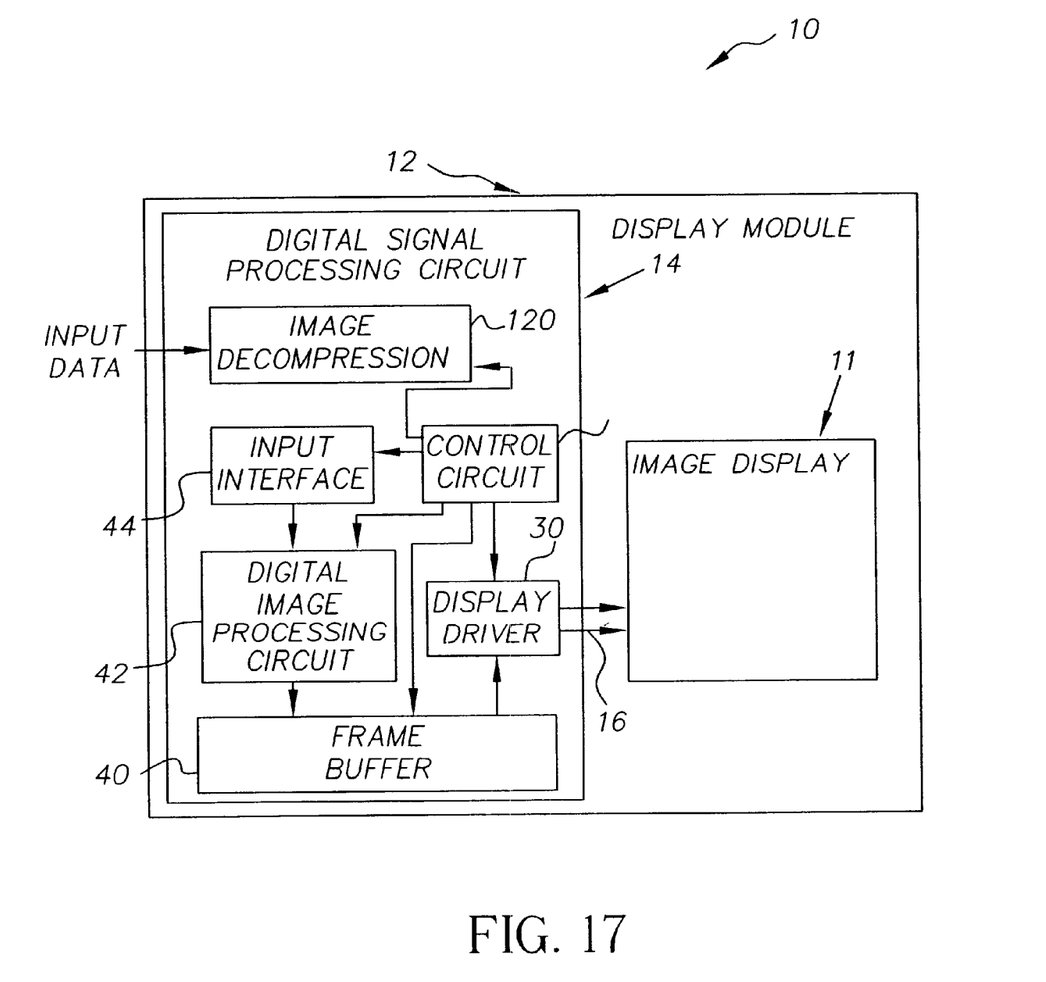
FIG. 17 is a diagram showing an embodiment of the present invention in which an image decompression block is added to the digital signal processing circuitry.

A further embodiment of the present invention, shown in FIG. 17, incorporates a decompression circuit 120 that is placed between the input interface 44 and the digital image processing circuit 42. The decompression circuit 120 implements one or more image decompression standards, such as JPEG or TIFF for still images, or MPEG for video images. This allows for a reduced amount of image data to be transmitted to the display module 10, decreasing data rates and thereby achieving a savings in system power dissipation and cost, especially in systems in which the source image content is already compressed.

The invention has been described in detail with particular reference to certain preferred embodiments thereof, but it will be understood that variations and modifications can be effected within the spirit and scope of the invention.

PARTS LIST

| | |
|---|---|
| 10 | display module |
| 11 | image display |
| 12 | substrate |
| 14 | digital signal processing circuit |
| 16 | interconnect |
| 30 | display driver circuit |
| 40 | frame buffer |
| 42 | digital image processing circuit |
| 43 | frame buffer memory element |
| 44 | input interface |
| 46 | control circuit |
| 50 | first area of digital image processing circuit |
| 60 | image contrast modification circuitry |
| 62 | image brightness modification circuitry |
| 64 | channel contrast modification circuitry |
| 66 | channel brightness modification circuitry |
| 68 | gamma correction circuitry |
| 70 | second area of digital image processing circuit |
| 80 | dual-ported RAM |
| 82 | input port |
| 84 | memory array |
| 86 | output port |
| 88 | input data rate |
| 90 | output data rate |
| 92 | single-ported RAM |
| 93 | memory array |
| 95 | interface |
| 96 | multiplexer |
| 97 | synchronous FIFO |
| 120 | decompression circuit |

What is claimed is:

1. A method of manufacturing a display module, comprising the steps of:
   a) providing a substrate; and
   b) forming on the substrate using the same manufacturing process
      i) an image display having an array of addressable display pixels and pixel driver circuitry responsive to control signals and image data for driving the pixels; and
      ii) a digital signal processing circuit having an input interface over which image data and control signals are received; a frame buffer for storing image data and from which image data is read during a display refresh; a display matrix driver circuit for receiving image data from the frame buffer and supplies control signals to the pixel driver circuitry; a control circuit for coordinating storage, retrieval, and display operations, such that the display module is capable of display refresh independently of external control; and an image processing circuit for improving the visual perception of the displayed image.

2. The method claimed in claim 1, wherein the manufacturing process is a thin film transistor (TFT) process.

3. The method claimed in claim 2, wherein the substrate is glass and wherein the TFT manufacturing process is silicon-on-glass.

4. The method claimed in claim 1, wherein the substrate is a material selected from group consisting of glass, single crystal silicon, steel, and plastic.

5. The method claimed in claim 1, wherein the input interface transmits and receives data asynchronous to the image display, the frame buffer and the display matrix driver circuit.

6. The method claimed in claim 1, wherein the digital signal processing circuit includes circuitry to decompress a compressed image data stream.

7. The method claimed in claim 1, wherein the image display is an electroluminescent display.

8. The method claimed in claim 7, wherein the image display is an organic light emitting diode OLED display.

9. The method claimed in claim 1, wherein the substrate is glass, the display is an array of organic light emitting diodes deposited on the glass substrate and includes a pattern of conductive oxide and amorphous, polycrystalline, or continuous grain silicon material.

10. The method claimed in claim 1, wherein the image processing circuit for improving the visual perception of the displayed image includes means for adjusting overall contrast and brightness.

11. The method claimed in claim 10, wherein the image processing circuit further includes means for adjusting, channel-dependent contrast, brightness, gamma adjustment, non-uniformity correction, and/or pixel defect correction.

12. The method claimed in claim 1, wherein the frame buffer comprises dynamic random access memory (DRAM).

13. The method claimed in claim 1, wherein the frame buffer comprises static random access memory (SRAM).

14. The method claimed in claim 1, wherein the frame buffer includes memory elements for each pixel that are located near the corresponding display pixels whereby the electrical performance of the display module is enhanced.

15. The method claimed in claim 1, wherein the frame buffer includes memory elements for each pixel that are located on the periphery of the image display, whereby the layout of the device is enhanced.

16. The method claimed in claim 1, wherein the frame buffer includes memory elements for each pixel that are located within the image display at the pixel locations, whereby the layout of the device is enhanced.

17. The method claimed in claim 1, wherein the frame buffer includes memory elements for each pixel and the digital image processing circuitry is located within the image display at each pixel location, whereby the layout of the device is enhanced and maximum calculation parallelism occurs.

18. The method claimed in claim 1, wherein the frame buffer includes memory elements for each pixel located at pixel locations and the digital image processing circuitry are located within the image display in multiple copies, whereby the layout of the device is enhanced and in-between calculation parallelism occurs.

19. The method claimed in claim 10, wherein the frame buffer includes memory elements for each pixel located at pixel locations and one part of the digital image processing circuitry is located outside of the image display and a second part of the digital image processing circuitry is located within the image display.

20. The method claimed in claim 10, wherein the digital image processing circuit is implemented in two portions, where the first portion operates on digital image data from the input interface and the results are stored in the frame buffer, and the second portion operates on digital image data from the frame buffer, so that the first portion operates on digital image data only when first brought into the display module, and the second part operates on digital image data every time the image display is refreshed.

21. The method claimed in claim 20, where the second portion of the digital image processing circuit performs an operation on a multiplicity of neighboring pixels.

22. The method claimed in claim 10, wherein the input interface circuit, the digital image processing circuit, the frame buffer, the display matrix driver circuit, and the control circuit are arranged on the periphery of the image display.

23. The method claimed in claim 1, wherein the display module is operated at a single common voltage.

24. The method claimed in claim 1, wherein the input interface includes a wireless transceiver for receiving the image data and control signals from an external device.

25. The method claimed in claim 24, wherein the wireless transceiver is an infrared, a radio, or a microwave transceiver.

26. The method claimed in claim 1, wherein the input interface includes an optical sensor and an optical cable connector for receiving the image data and control signals from an external device.

27. The method claimed in claim 10, wherein the image processing circuit is programmable through the input interface.

28. The method claimed in claim 1, wherein the image data is received from an external device at a data rate lower than the rate at which the image data is transferred from the frame buffer to the image display, whereby dynamic power dissipation of the overall display module is decreased.

29. The method claimed in claim 1, wherein the frame buffer contains enough memory for a multiplicity of images, so that one buffer may be used for image display refresh and the remaining buffer or buffers are used for buffering digital image data for future display.

30. The method claimed in claim 1, further comprising the step of simultaneously forming a voltage generation circuit on the common substrate using the same manufacturing method.

* * * * *